Feb. 23, 1965   E. A. HALL   3,170,262
AUTOMATIC FISH CATCHER
Filed July 1, 1963

INVENTOR.
EMMETT A. HALL

United States Patent Office 3,170,262
Patented Feb. 23, 1965

3,170,262
AUTOMATIC FISH CATCHER
Emmett A. Hall, Rte. 1, Box 346, Vernal, Utah
Filed July 1, 1963, Ser. No. 291,685
1 Claim. (Cl. 43—15)

My invention is directed toward automatic fish catchers.

It is the object of my invention to provide an automatic fish catcher which can hold a fishing rod and reel in position whereby a fish can be hooked automatically; thereafter the hooked fish can be reeled in by hand.

Another object of my invention is to provide a new and improved catcher of the character indicated which does not use an automatic reel and wherein the fiisherman can use an unlimited amount of line.

Yet another object of my invention is to provide a new and improved automatic fish catcher which can be manufactured easily and inexpensively.

All of the foregoing and still further objects and advantages of my invention will now be explained with reference to this specification and to the drawings wherein.

Figure 1:
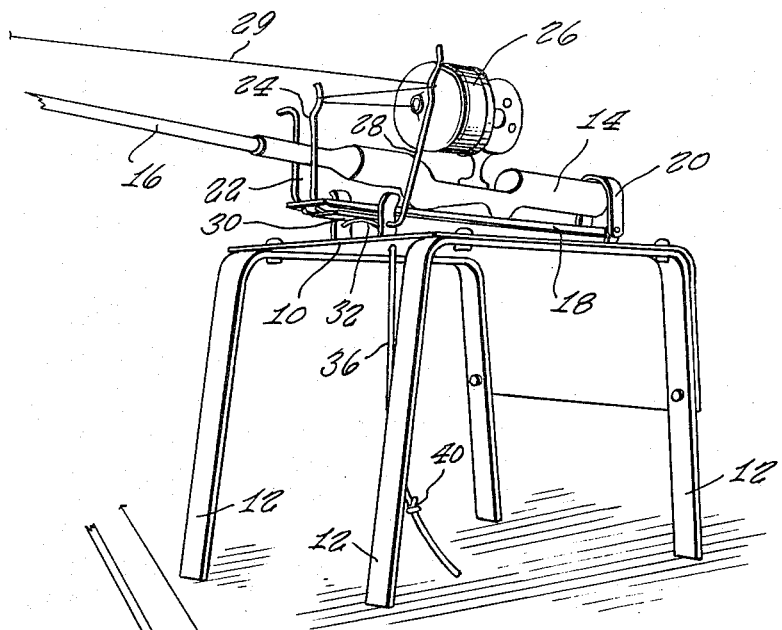
FIGURE 1 is a perspective view of my invention in "set" position.
Figure 2:
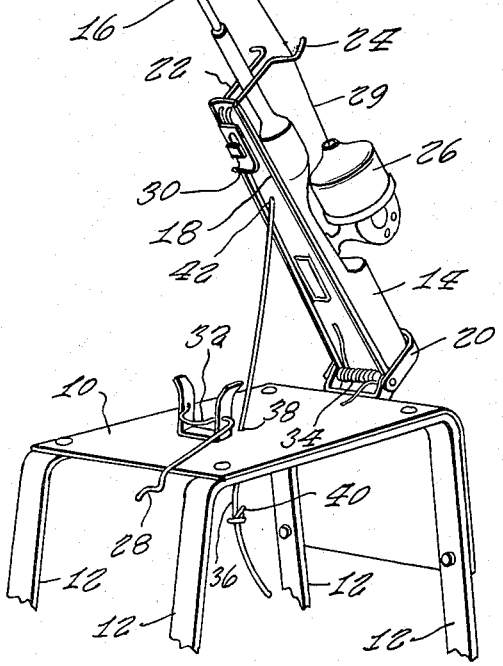
FIGURE 2 is a perspective view of my invention in "tripped" position.

Referring now to FIGURE 1, there is provided a flat horizontal base 10 supported by four spaced apart legs 12. An elongated holder support 18 is pivotally mounted at the rear end thereof to the top of the base and at the rear end of the base so that the holder support projects forwardly over the base. A torsion spring 34 mounted on the rear end of the support 18, between said base and said support, normally urges the support to an upright position as shown in FIG. 2. Mounted on the rearward end of the support 18 is a back pole holder 20 adapted to retain the butt end 14 of a fishing rod 16. Provided on the forward end of the support 18 in a front pole holder 22 in the form of two spaced upstanding legs which receive the rod 16 therebetween. On the uppermost portion of one of said legs is a line guide 24. Depending from the bottom side of said support and to the rear of the front holder is a detent 30, the purpose thereof to be explained later.

Mounted on said base 10, directly under the detent 30, is an upwardly opening U-shaped bracket adapted to receive support 18 and detent 30 between the legs thereof. An L-shaped lever 28 is rotatably mounted on the legs of the U-shaped member with the short leg 32 extending between the legs. The short leg 32 is bent to substantially a U-shape and is adapted to engage with the detent 30 to hold the support in a latched position as shown in FIG. 1.

To prevent the support 18 from being pivoted past a desired position the base and support are provided with aligned openings 38 and 42, respectively, and a cord 36 is passed through the openings and knotted above the support and below the base as shown at 40.

To use the device the holder support 18 is manually forced to a position between the legs of the U-shaped bracket and the lever 28 is rotated so that the long leg is in an upright position and the U-shaped short leg engages the detent 30. When the support 18 is released the pressure exerted by the spring and transmitted through the support and detent hold the lever 28 in its set position and the U-shaped short leg holds the support in its latched position as shown in FIG. 1. The rod 16 is then placed in the front pole holder 22 and the butt of the rod is placed in the back pole holder 20. The fishing line 29 extending from the reel 26 to a line guide on the pole (not shown) is looped around the line guide 24 and back around the upper portion of the long leg of lever 28 as shown in FIG. 1. With the device set in this position the fisherman can sit back and wait for a fish to take the hook.

When a fish takes the hook and pulls on the line, lever 28 is rotated forward and downward releasing the short leg 32 from the detent 30 and thereby allowing support 18 to pivot upward a distance determined by the length of the cord 36. When the support pivots upward the pull exerted on the line firmly sets the hook in the fish's mouth. The rod can then be removed from the holders 20, 22 and the fish played in the conventional manner.

While I have described my invention with particular reference to the drawings, my protection is to be limited only by the terms of the claim which follows.

I claim as follows:

An automatic fish catcher comprising a horizontal base have a plurality of legs depending therefrom, a line equipped fishing pole having a handle, an elongated holder support pivotally secured at one end thereof to the top of said base, and adapted to hold the handle of said pole, a spring positioned at said one end to exert a lifting force on said support, means at the opposite end of said support defining an upstanding front pole holder and guide for said line, depending detent means on said support at said opposite end, an upwardly opening U-shaped bracket on said base having leg portions adapted to receive said support and said detent means therebetween, and an L-shaped lever having a relatively short U-shaped arm disposed between and pivotally connected to said leg portions and engageable with said detent means to hold said support in a latched position, said lever having a relatively long arm projecting upwardly in said latched position of said support and about which a portion of said line extending from said guide is wound, whereby upon exertion of a pull on said line the lever may be swung to release the detent, said spring swinging said support and handle upwardly.

References Cited by the Examiner

UNITED STATES PATENTS

| | | | |
|---|---|---|---|
| 1,957,853 | 5/34 | Sibley | 43—15 |
| 2,811,801 | 11/57 | Daniel | 43—15 |
| 2,964,868 | 12/60 | Bennett | 43—15 |
| 3,055,135 | 9/62 | Lewis | 43—15 |

SAMUEL KOREN, *Primary Examiner.*

ABRAHAM G. STONE, *Examiner.*